(12) United States Patent
Reynolds et al.

(10) Patent No.: US 8,224,677 B2
(45) Date of Patent: Jul. 17, 2012

(54) SYSTEM AND METHOD FOR ADMINISTERING LIFE INSURANCE POLICIES ISSUED PRIOR TO UNDERWRITING

(75) Inventors: Leslie Ann Reynolds, Simsbury, CT (US); Michael J. Roscoe, South Windsor, CT (US); Rodney R. Howard, Weatogue, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 303 days.

(21) Appl. No.: 12/624,044

(22) Filed: Nov. 23, 2009

(65) Prior Publication Data

US 2011/0125651 A1     May 26, 2011

(51) Int. Cl.
    *G06Q 40/08*     (2012.01)
(52) U.S. Cl. .......................................................... 705/4
(58) Field of Classification Search ........................ 705/4
See application file for complete search history.

(56) References Cited

U.S. PATENT DOCUMENTS

| | | | |
|---|---|---|---|
| 7,395,219 B2 | 7/2008 | Strech | |
| 7,580,872 B2 | 8/2009 | Van Slyke et al. | |
| 2002/0002475 A1 | 1/2002 | Freedman et al. | |
| 2002/0029158 A1 | 3/2002 | Wolff et al. | |
| 2002/0087364 A1 | 7/2002 | Lerner et al. | |
| 2002/0120474 A1* | 8/2002 | Hele et al. ......................... | 705/4 |
| 2003/0074231 A1* | 4/2003 | Renes et al. ...................... | 705/4 |
| 2003/0083908 A1 | 5/2003 | Steinmann | |
| 2004/0148201 A1 | 7/2004 | Smith et al. | |
| 2007/0244726 A1 | 10/2007 | Jenkins | |
| 2008/0040163 A1* | 2/2008 | Harlin et al. ...................... | 705/4 |
| 2008/0069408 A1* | 3/2008 | Cervantes ..................... | 382/115 |
| 2008/0126138 A1 | 5/2008 | Cherney et al. | |
| 2009/0182583 A1 | 7/2009 | Harkensee et al. | |
| 2009/0182584 A1* | 7/2009 | Harkensee et al. ............... | 705/4 |
| 2009/0182585 A1 | 7/2009 | Harkensee et al. | |
| 2011/0040582 A1 | 2/2011 | Mullins | |

OTHER PUBLICATIONS

Rapid Decision Term, Fidelity Life Association, www.fidelitylifeassociation.com/life/rdterm.asp (Accessed Nov. 24, 2009).
Rapid Decision Mortgage Term, Fidelity Life Association, www.fidelitylifeassociation.com/life/rdMortgage.asp (Accessed Nov. 24, 2009).

* cited by examiner

*Primary Examiner* — James Vezeris
(74) *Attorney, Agent, or Firm* — Howard IP Law Group, PC

(57) ABSTRACT

A computer system for administering applications for life insurance has a processor and a memory storage device in communication with the processor. The processor is configured to receive data indicative of an application and an initial premium payment from a proposed insured for life insurance; based on the received data, determine whether the proposed insured is uninsurable; responsive to a determination that the proposed insured is not uninsurable, generate an output signal having data indicative of a decision to respond to the application by issuing a policy and commencing a comprehensive underwriting process; receive data indicative of a result of the comprehensive underwriting process; based on the result of the comprehensive underwriting process, determine a rating of the proposed insured; and, based on the rating, provide an output signal indicative of a same or changed premium for the policy.

33 Claims, 7 Drawing Sheets

SYSTEM AND METHOD FOR ADMINISTERING LIFE INSURANCE POLICIES ISSUED PRIOR TO UNDERWRITING

FIELD OF INVENTION

The present invention relates to computer systems, and particularly to computer systems for administering financial products such as life insurance policies.

BACKGROUND

In the process of application for and issue of life insurance policies, a prospective insured typically meets with a broker or other representative. The prospective insured, working with the broker, completes a detailed form furnished by an insurance company with information pertinent to underwriting the risk associated with insuring the proposed insured. The broker submits the completed form to the insurance company. Upon receipt of the form, the insurance company performs a comprehensive underwriting process. The comprehensive underwriting process includes use of the information on the form in rating the prospective insured, and may also include obtaining information from at least one treating physician, arranging for a medical technician or other medical professional to meet with the proposed insured and draw blood and obtain other data, such as height and weight data. At the completion of the comprehensive underwriting process, the insurance company advises the broker whether the proposed insured will be insured. If the proposed insured will be insured, the insurance company advises the broker of the rating and the amount of coverage approved. Depending on the type of policy, the insurance company may provide the premium for the amount of coverage. For certain types of policies, such as flexible premium adjustable life policies and universal life policies, a rating and a schedule of charges are provided.

The process of comprehensive underwriting, as generally described above, requires a long period, such as about 35 days. From the perspective of the prospective insured, this may be an undesirably long time period. For example, the prospective insured may wish to have life insurance coverage within a shorter period of time. The prospective insured is uncomfortable with an unresolved status for this long period of time. During this long period of time, the prospective insured may reconsider whether to obtain coverage, or to change the type of coverage or the insurer. Once the comprehensive underwriting process is complete, the prospective insured may not be interested in the policy. From the insurance company s perspective, the time period is thus disadvantageous.

One approach to addressing the length of time associated with comprehensive underwriting is a temporary insurance policy. A temporary life insurance policy provides coverage for a limited period of time, such as a period of 90 days, while an insurance company performs comprehensive underwriting to determine insurability and a rating for a longer term. The temporary life insurance policy may be issued based on responses to a limited set of questions designed to eliminate those with serious medical conditions or otherwise at an elevated risk of dying within the limited term of the temporary insurance policy. The temporary life insurance policy may terminate on issue of a comprehensively underwritten policy, with the premiums paid on the temporary life insurance policy being credited, in whole or in part, against the premiums on the comprehensively underwritten life insurance policy.

Another approach to addressing the length of time associated with comprehensive underwriting is conditional receipt coverage. When an applicant submits an application for life insurance, with a premium payment, the receipt for the payment provides life insurance for a short period of time. The coverage continues until the insurance company completes comprehensive underwriting and either declines to provide coverage or issues a policy.

Further approaches to addressing the undesirable aspects of the length of time associated with comprehensive underwriting of a proposed insured are disclosed in U.S. Patent Publication No. 2009/0182583 (Harkensee 583), U.S. Patent Publication No. 2009/0182584 (Harkensee 584), and U.S. Patent Publication No. 2009/0182585 (Harkensee 585). In Harkensee 583, an insurer sells a life insurance policy with two distinct coverage periods. Prior to making the policy available, the insurer underwrites the insurance contract on a limited basis using information obtainable by performing database queries, such as information about the prescription drugs an individual takes or has taken, the proposed insured s driving and criminal record, and medical and non-medical information. If the limited underwriting qualifies the prospective insured for coverage, the premium amounts may be higher than the premiums would be for a traditional policy offered with temporary conditional receipt coverage with an identical benefit amount. During the first coverage period, the insured may submit additional information, test results and/or other material. Comprehensive medical underwriting may be performed. If the insured is qualified, the insurance contract is amended modified or replaced in order to provide for an extended coverage period. If the insured is not qualified, the insurance contract may expire after the first coverage period, or may be modified so as to provide reduced coverage for the extended coverage period.

In Harkensee 584, a life insurance policy has a single coverage period. The initial premiums paid by the insured are relatively high compared to premiums paid for standard conditional receipt coverage or comprehensively underwritten policies, but are generally lower than typical premiums for standard simplified issue policies. The insurer accepts the application after completing underwriting on a limited basis, preferably using information available in databases. The insured has the option of submitted additional information, such as medical test results. An underwriter then comprehensively underwrites the insured. If the results of the underwriting are satisfactory, the premiums owed by the insured are reduced significantly for the remainder of the term of the policy or the benefit amount is increased.

In Harkensee 585, a prospective insured makes an offer for life insurance. The insurance company searches databases to underwrite the insurance policy on a limited basis. If the limited underwriting qualifies the individual, the insurance company provides blended coverage including an all-cause coverage portion and an accidental death only coverage portion. The total benefit amount may be the insured s desired coverage amount. During an initial policy period, the blended coverage includes a relatively smaller all-cause portion and a relatively higher accidental death only portion. The policy may permit the insured to submit information to enable comprehensive medical underwriting. Based on a risk classification as indicated by the comprehensive medical underwriting, the insurance company may modify the blended coverage to provide an increased all-cause benefit amount.

All of the above approaches have disadvantages. Temporary insurance terminates within a short period of time, such as 90 days, and thus provides the insured no assurance of continued coverage. Conditional receipt coverage also terminates relatively quickly, such as upon completion of comprehensive underwriting, which may be within about 35 days, and thus does not meet the need for long term life insurance coverage. In Harkensee 583, the coverage may terminate at the end of a first coverage period. In Harkensee 584, there are two levels of premium; a higher, first level may be reduced upon comprehensive underwriting. In Harkensee 585, the policy does not provide an all cause or all risk policy for the same cost of coverage as a comprehensively underwritten policy.

SUMMARY

In one embodiment, a computer system for administering applications for life insurance includes a processor and a memory storage device in communication with the processor. The processor is configured to: receive data indicative of an application by a proposed insured for life insurance, the data including a rating category, and an initial premium payment; based exclusively on the received data, determine whether the proposed insured is uninsurable; responsive to a determination that the proposed insured is uninsurable, generate an output signal having data indicative of a decision to respond to the application by declining to provide insurance; responsive to a determination that the proposed insured is not uninsurable, generate an output signal having data indicative of a decision to respond to the application by issuing a policy, having the received rating category assigned to the proposed insured, and commencing a comprehensive underwriting process; receive data indicative of a result of the comprehensive underwriting process; based on the result of the comprehensive underwriting process, determine a rating category of the proposed insured; and if the determined rating category is the same as the received rating category, provide an output signal indicative of no change to the policy, and otherwise provide an output signal indicative of a changed premium for the policy and no other change to the policy.

In an embodiment, a computer system for administering applications for life insurance includes a processor; and a memory storage device in communication with the processor. The processor is configured to: receive data indicative of an application and an initial premium payment from a proposed insured for life insurance; based on the received data, determine whether the proposed insured is uninsurable; responsive to a determination that the proposed insured is not uninsurable, generate an output signal having data indicative of a decision to respond to the application by issuing a policy and commencing a comprehensive underwriting process; receive data indicative of a result of the comprehensive underwriting process; based on the result of the comprehensive underwriting process, determine a rating of the proposed insured; and, based on the determined rating, provide an output signal indicative of a same or changed premium for the policy.

In an embodiment, a computer-implemented method for administering evaluation and issue of life insurance policies includes comprising: receiving by a processor, and storing by the processor in a memory device in communication with the processor, data indicative of an application and an initial premium payment from a proposed insured for life insurance; based on the received data, determining by the processor whether the proposed insured is uninsurable; responsive to a determination that the proposed insured is not uninsurable, generating by the processor an output signal having data indicative of a decision to respond to the application by issuing a policy and commencing a comprehensive underwriting process; receiving by the processor data indicative of a result of the comprehensive underwriting process; based on the result of the comprehensive underwriting process, determining by the processor a rating of the proposed insured; based on the determined rating, providing by the processor an output signal indicative of a same or changed premium for the policy.

In an embodiment, a computer-readable medium having a plurality of instructions thereon which, when executed by a processor, cause the processor to: receive data indicative of an application and an initial premium payment from a proposed insured for life insurance; based on the received data, determine whether the proposed insured is uninsurable; responsive to a determination that the proposed insured is not uninsurable, generate an output signal having data indicative of a decision to respond to the application by issuing a policy and commencing a comprehensive underwriting process; receive data indicative of a result of the comprehensive underwriting process; based on the result of the comprehensive underwriting process, determine a rating of the proposed insured; and based on the determined rating, provide an output signal indicative of a same or changed premium for the policy.

In an embodiment, a computer system for issue and administration of life insurance policies, has a processing module for receiving data indicative of an application and an initial premium payment from a proposed insured for life insurance and for determining, based on the received data, whether the proposed insured is uninsurable; an administration module for, responsive to a determination by the processing module that the proposed insured is not uninsurable, administering a comprehensive underwriting process; and for determining a rating classification based on a result of the comprehensive underwriting process; and an issuance module for issuing an insurance policy to the proposed insured responsive to the determination by the processing module that the proposed insured is not uninsurable.

In an embodiment, a system for life insurance administration has at least one policy administration device having a processor and a communications interface. The policy administration device is configured to receive data indicative of an application for life insurance and an initial premium payment via the communications interface from a proposed insured for life insurance, the received data being transmitted from at least one handheld communications device operated by the proposed insured. The policy administration device is further configured to determine via the processor whether the proposed insured is not uninsurable and if so then generate a policy for transmission to the handheld communications device; the policy administration device is further configured to enable a comprehensive underwriting process and process via the processor a rating of the proposed insured. The policy administration device is further configured to, based on the determined rating, provide an output signal via the communications interface indicative of a same or changed premium for the policy to the handheld communications device operated by the proposed insured.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical computer systems and methods for underwriting and administration of life insurance policies. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

A challenge in connection with comprehensive underwriting is the cost involved. It is undesirable for an insurance company to incur the expense of comprehensive underwriting in cases where the prospective insured may choose not to pay the premium and accept insurance.

In an embodiment, a system of a life insurance company receives an indication of an application for life insurance and an initial premium payment. The indication of an application is accompanied by responses to a set of questions. The questions are posed to identify those prospective applicants for insurance who are aware of facts that would render the prospective applicant uninsurable. Such facts include having received a diagnosis of or treatment for certain diseases and conditions. If the responses do not indicate that the prospective insured is uninsurable, a life insurance policy is issued for the full term of coverage. The policy is issued for the total amount of coverage requested or, if the proposed insured has other in force life insurance coverage, for the maximum amount under the insurance company s policies. The policy may be issued immediately. For example, the policy may be printed and faxed to the broker s office the same day as the application and premium payment are submitted. The policy contains terms permitting the life insurance company to adjust the rating of the prospective insured in response to the results of full medical underwriting. After receipt of the results of the comprehensive underwriting, the policy continues in force; the rating and the premium amount may be updated.

Figure 1:
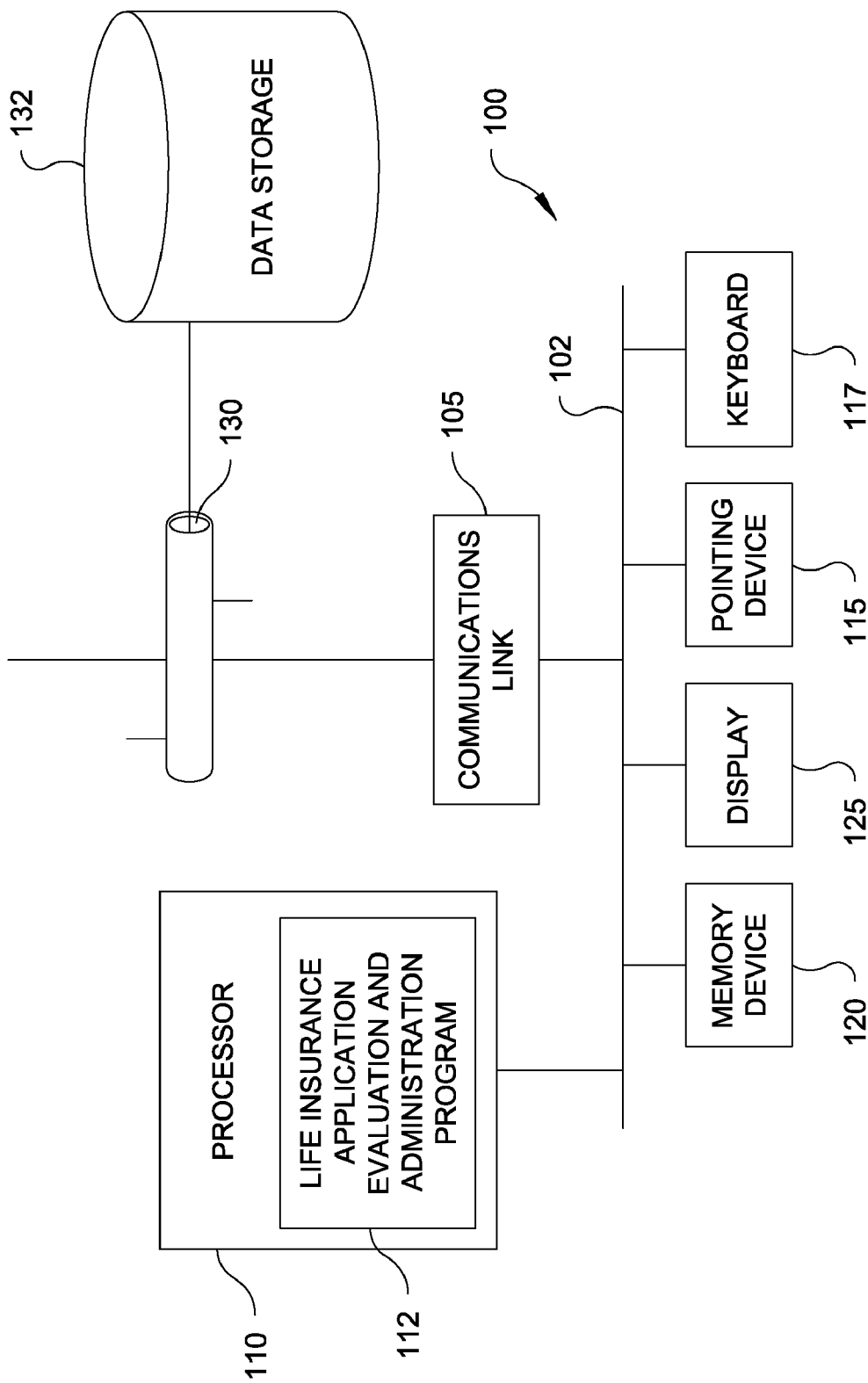
FIG. 1 is a schematic diagram of an exemplary computer system for implementation of a method and system of the invention.

Referring to FIG. 1, an exemplary computer system 100 for use in an implementation of the invention will now be described. In computer system 100, processor 110 executes instructions contained in programs such as life insurance application and administration program 112. Programs may be stored on suitable media, such as optical or magnetic disks, fixed disks with magnetic storage (hard drives), tapes accessed by tape drives, and other storage media. Processor 110 communicates, such as through bus 102 and/or other data channels, with communications link 105 and memory device 120, receives data from user inputs such as pointing device 115 and keyboard 117, and provides data to outputs, such as data to video drivers for formatting on display 125. Memory device 120 is configured to exchange data with processor 110, and may store programs containing processor-executable instructions, and values of variables for use by such programs. In an embodiment, inputs may include user interfaces, including workstations having keyboards, touch screens, pointing devices such as mice, or other user input devices, connected via networked communications to processor 110. Outputs may include displays and printers. Communications link 105 may communicate with remote sources of information, and with systems for implementing instructions output by processor 110, via LAN 130. LAN 130 is merely exemplary, and communication may be by one or more of suitable communication methods, including over wired or wireless local area networks and wide area networks, and communication between networks, including over the Internet. Any suitable data and communication protocols may be employed. Data storage 132, which may include a wide variety of data acquired and processed in accordance with embodiments, is accessed via LAN 130. Data storage 132 may include data concerning individual applications for insurance, criteria for rating applicants for insurance with respect to mortality risk, criteria for setting premiums, and other data by way of example.

Figure 2:
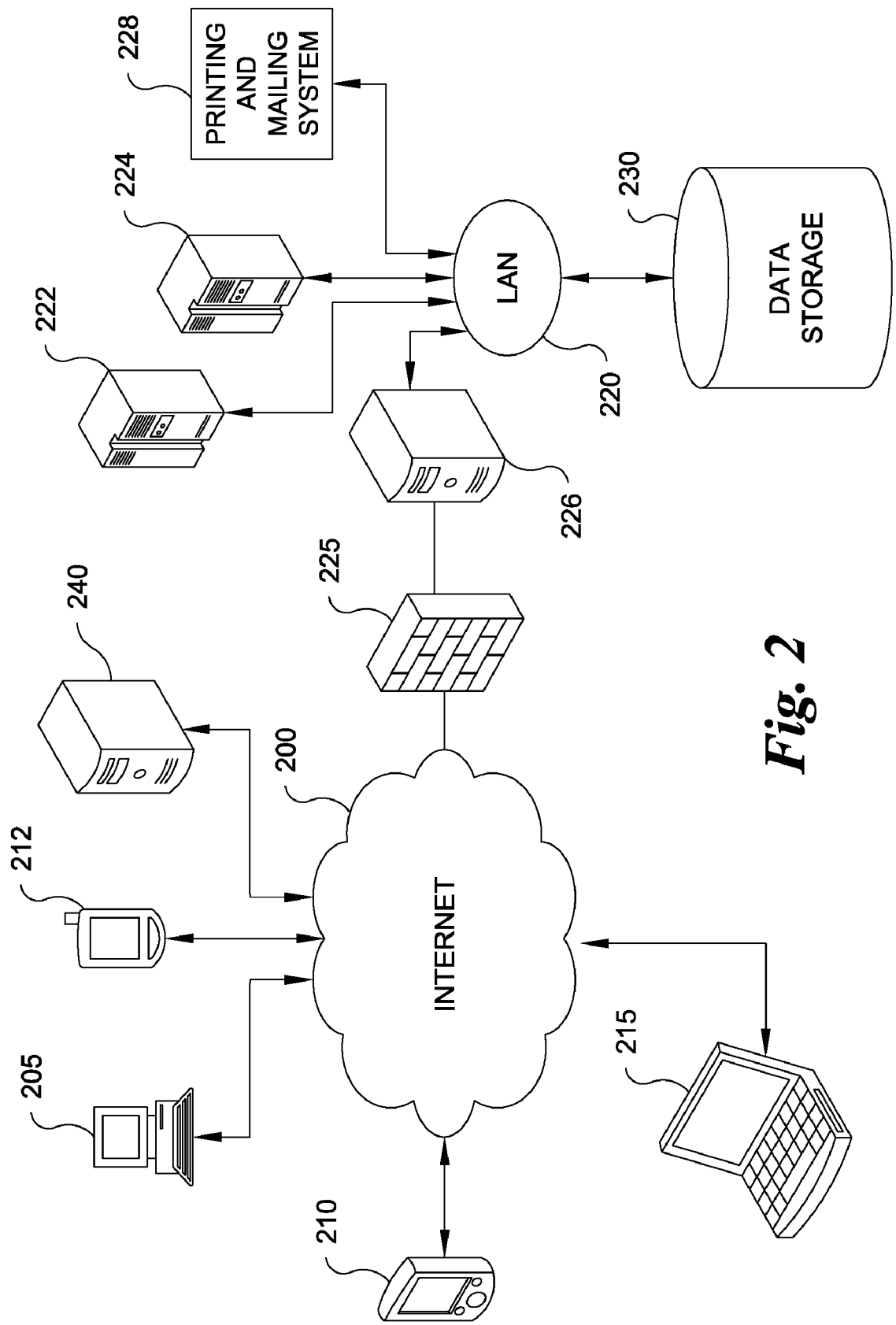
FIG. 2 is a schematic diagram of an exemplary network for implementation of a method and system of the invention.

Referring now to FIG. 2, a schematic diagram of a network arrangement including a client server arrangement for implementation of a method and system in accordance with an embodiment of the invention is presented. In the arrangement of FIG. 2, client devices 205, 210, 212, 215 may be connected via the Internet 200 to server 226. In an implementation, client devices 205, 210, 215 may be personal computers running an operating system such as Windows XP, Windows Vista, or Apple Tiger, thin client devices, portable devices such as personal digital assistants (running the Palm OS, by way of example), cell phones, or other devices. Client device 212 may be a web-enabled smart phone. Client devices may be operated by insurance agents or brokers, or by individual prospective insureds or prospective policy owners, other financial advisors, or by personnel of an insurance or financial services provider. While in this example Internet 200 connects the client devices, in other embodiments, a different network may include, in addition to or in place of the Internet, a corporate intranet, wireless and wired communications channels, and other network features. Firewall unit 225 may be configured to provide data security services with respect to systems and networks, including exemplary server 226 and LAN 220. Firewall unit 225 may include distinct hardware, including a processor and memory device, to provide virus protection and user authentication services, for example. In an embodiment, the devices protected by firewall unit 225 may be systems of an insurance carrier. Server 226 may have a processor that is configured or configurable to receive data, such as data incorporated in applications for life insurance. Server 226 may receive requests to generate life insurance policy documents, and may pass those requests, such as via LAN 220, to another computer system, such as mainframe system 222, which may be based on the IBM/360 platform. Mainframe system 222 may in response to a request and suitable data generate policy documents, which may then be passed in electronic format via LAN 220 to printing and mailing system 228. Printing and mailing system 228 may print and mail documents provided by mainframe system 222, or print and mail illustrations furnished by server 226, among other examples. In an embodiment, policy documents may be transmitted in electronic form to a client system, such as a client system in a broker s office, for printing and delivery to the insured. Policy documents may also be transmitted via fax, or made available on a server for review, with necessary credentials communicated by e-mail or a web page to a client device. Server 226 may run various programs that serve to initiate and monitor sessions with one more of client devices 205, 206, 207. Server 226 may serve for display on client devices 205, 210, 212, 215, prompts to the user for data required to complete applications for life insurance. Client devices 205, 210, 212, 215 may have local application programs that prompt the user to submit information needed for a life insurance policy application and the data necessary to provide the prospective insured s bank to execute an electronic funds transfer to a bank account of the insurance company.

Server 226 may implement instructions in programs that provide a web front end, linked to back end computer systems for implementing administration of applications for life insurance. For example, mainframe 224 may include programs for administration of applications for life insurance. Data storage 230 may include data received in the application for insurance, data relating to an insurance broker, medical and other reports received during underwriting of the application for insurance, and other data. Server 226 may, by way of example, provide a user with options to obtain a status on the underwriting process, and be configured to receive signals from user device 205, 210, 215 requesting such information, and to communicate such information to back end systems such as mainframe 224 and data storage 230 via LAN 220. Server 226 may in response to a request from a client device, access and serve for display on the client device data relating to a policy, applications for insurance, and the status of the medical underwriting process.

Server 226 may also access third party systems, such as server 240. Server 240 may be a system of a third party. By way of example, server 240 may control access to data records that are accessed during the medical underwriting process.

In the prior art, the present value of the cost providing a death benefit for a policy may be equal to the following sum:

$$\text{Present value of standard death benefit} = \sum_{t=0}^{N} NAR_t \times v^t \times {}_tp_{x(standard)} \times \mu_{x(standard)}(t)$$

where NAR is the Net Amount at Risk, which is equal to the total death benefit less the cash value of the policy. The term t is the year of the policy, and N is the number of years that the policy will be in force. The term $v^t$ is a factor representing the present value at time t. The term ${}_tp_x$ is a probability of survival of a life at age (x) at issue of the policy to year (x)+t. Such probabilities are derived from actuarial tables, and are well known in the actuarial field. The term $\mu_x(t)$ is the force of mortality of a life, at age (x) at issue of the policy, in year (x)+t. The force of mortality for a year is the likelihood of an insured dying during the year.

The present value of the cost of a death benefit for a policy issued prior to comprehensive underwriting may be represented as:

$$\text{Present value of death benefit using new system} = \sum_{t=0}^{N} NAR_t \times v^t \times {}_tp_{x(new)} \times \mu_{x(new)}(t)$$

Since the insureds under the new policy will include insureds with a higher mortality risk, the force of mortality for any given year will be at least as great as the force of mortality using standard approaches; this relationship which may be expressed as: $\mu_{x(new)}(t) \geq \mu_{x(standard)}(t)$ Since there is a higher mortality risk, the likelihood that the insured is alive in any given year is no greater than using the standard approach; this relationship may be expressed as: ${}_tp_{x(standard)} \geq {}_tp_{x(new)}$.

Embodiments of the method and system of the invention will result in the percentage of policies that are subject to comprehensive underwriting that are continued in force by the insured after the insured is advised of the results of comprehensive underwriting, being higher than the percentage of policies that are issued after comprehensive underwriting in prior art standard policies. The rapid issue of the policy will reduce the likelihood of the prospective insured choosing not to proceed with the policy when the results of comprehensive underwriting are received. The cost of underwriting all of the policies using embodiments of a method and system of the invention will be shared over an effectively larger number of policies, and thus over a larger amount of premium income per underwritten application or policy. The underwriting cost per policy that is issued and continued in force will decrease as compared with the underwriting cost per policy that is issued in accordance with prior art procedures.

The unit cost for underwriting may be expressed as $$\text{Underwriting Unit Cost} = \frac{\text{Total Costs Associated with Underwriting}}{\text{Number of Policies Issued}_{standard}}$$

The underwriting unit cost for a method and system according to an embodiment of the invention may be expressed as:

$$\text{Underwriting Unit Cost (new)} = \frac{\text{Total Costs Associated with Underwriting}}{\text{Number of Policies Continued}_{(New)}}$$

The number of applications issued, for a standard number of cases underwritten, is anticipated to be greater employing a method and system according to the invention. This relationship may be expressed as:

$$\text{Number of Policies Issued}_{New} \geq \text{Number of Policies Issued}_{standard}$$

The force of mortality for a method and system according to an embodiment of the invention may be calculated with reasonable certainty. The use of questions eliminates issue of policies to applicants who know that they have diseases or conditions rendering them uninsurable, and therefore avoids the risk of anti-selection. The risk of anti-selection arises if those who know that they are uninsurable believe that they can obtain life insurance using the new system, and therefore applications from uninsurable individuals exceed the percentage of uninsurable individuals in the general population. The percentage of uninsurable individuals that are not aware that they are uninsurable may be predicted from actuarial statistics well known in the field, so that the mortality risk associated with a method and system of the invention may be determined with a high degree of accuracy.

Figure 3A:
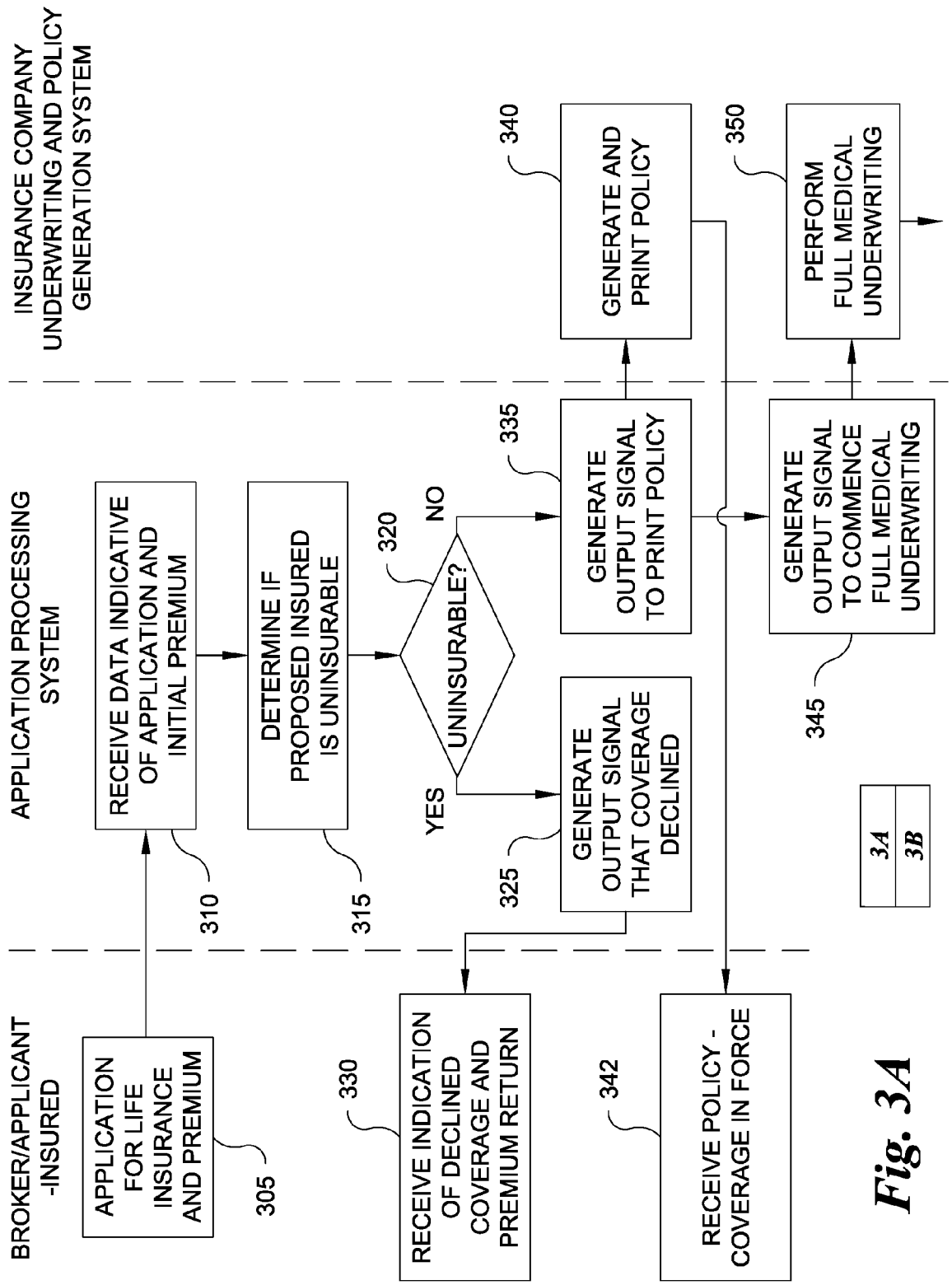
FIGS. 3A' 3B are an exemplary process flow diagram of a method according to an embodiment of the invention.
Figure 3B:
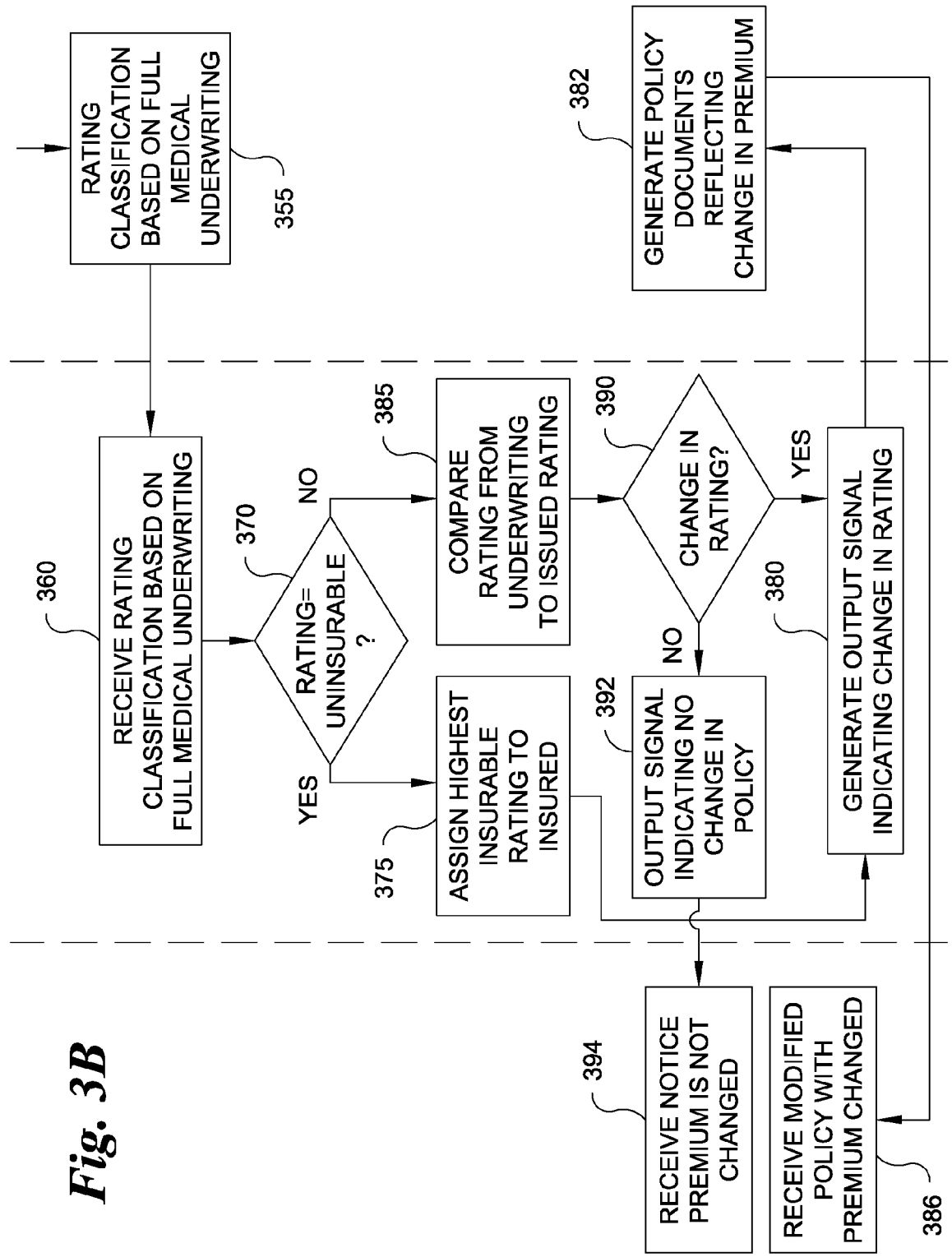

Referring now to FIGS. 3A and 3B, an exemplary embodiment of a method and system according to the invention will be discussed. In an embodiment, a prospective insured seeking life insurance coverage communicates with an insurance broker. The insurance broker may include an independent insurance agent, an agent who represents only a single insurance company, or another insurance agent or representative.

The prospective insured selects parameters of the proposed life insurance policy, including the type of policy, e.g., term life, whole life, variable, universal and other variations, riders, additional coverages and the like; a death benefit amount, and other parameters and features. The broker will typically ask the prospective insured certain questions relating to the health of the prospective insured that will affect the rating of the prospective insured. These questions may include: whether the prospective insured is a smoker, the weight of the prospective insured, whether the prospective insured has been treated for certain diseases and conditions; the ages of the parents of the prospective insured at death and the causes of death; whether the parents of the prospective insured have had certain diseases or conditions and the age at which those diseases or conditions were diagnosed. Based on the responses to these questions, the broker will make a judgment as to the likely rating of the prospective insured. Based on the age and gender of the prospective insured and the likely rating, as well as the various features of the desired policy, the broker will identify one or more policies and insurers, and the likely premiums associated with those policies.

In an embodiment, the broker may work with the prospective insured to complete a questionnaire for a life insurance policy. In an embodiment, the questionnaire may include a limited set of questions regarding the health of the prospective insured. The responses to these questions indicate whether the prospective insured has knowledge of any facts which would render the proposed insured uninsurable. An individual regarded as uninsurable is an individual who has a risk factor such that a life insurance company considers the individual not eligible for life insurance. Such risk factors may include diagnoses of various medical conditions, such as most cancers or diabetes, or a history of treatment for medical issues.

In an embodiment, a broker may transmit the completed application for insurance, including responses to questions indicative of knowledge of facts which would render the proposed insured uninsurable, and a premium. A computer system receives 310 data indicative of the application and the initial premium. The computer system applies predetermined rules to the responses to questions for eliciting knowledge of facts which would render the proposed insured uninsurable. The computer system may determine 315 whether the proposed insured is uninsurable. If the proposed insured is determined to be uninsurable 320, then the system generates an output signal 325 having data indicative of instructions to notify the broker that coverage has been declined. The output signal may also include instructions to return the premium payment. By way of example, a check writing system may be provided with instructions to generate and mail a paper check to the prospective insured, or to the prospective insured in the care of the prospective insured s broker. The broker may receive 330 the indication that coverage is declined and the returned premium.

If the proposed insured is determined 320 not to be uninsurable, the system may generate an output signal 335 having data indicative of instructions to generate a policy. The output signal with instructions to generate a policy may be furnished to a separate computer system responsible for generation of life insurance policies. The output signal may include data indicative of variables needed for generation of the life insurance policy. The data may include data furnished by the broker. The data may include identification of a particular type of policy, name and address of the insured, name and address of one or more beneficiaries, death benefit amounts, identification of one or more riders, and other data customarily employed by a policy generation system. In an embodiment, the policy may be generated having a premium amount based on a rating furnished with the application for life insurance. The policy may include terms and conditions that are specific to policies issued prior to the completion of comprehensive underwriting. For example, such terms and conditions may include terms to the effect that the proposed insured must cooperate with the comprehensive underwriting process, such as by meeting with a medical technician to have blood drawn, provide consents for treating physicians to provide information to the insurance company, and the like. Such terms and conditions may further include terms to the effect that the insurance company may change the rating or rating category of the proposed insured based on the results of the comprehensive underwriting process, and may change the premium based on the rating category change. Such terms and conditions may further include terms to the effect that a rating determined based on the results of the comprehensive underwriting process is retroactive to the policy issue date. Premiums may also be determined retroactively to the issue date based on the rating determined based on the results of the comprehensive underwriting process. In an embodiment, terms and conditions may provide that the insured may obtain a full refund of any premium paid at issue upon receipt of the rating resulting from the comprehensive underwriting process.

The policy generation system may generate 340 a policy. The policy may be printed and provided to a mailing system for mailing to the proposed insured. It will be appreciated that steps of review of the printed policy may be performed prior to mailing. Upon mailing of the policy, the policy comes into effect, and the proposed insured becomes an insured. The insured receives 342 the policy, and learns that the policy is in effect.

The policy may be furnished to the insured in a variety of manners. By way of example, the policy may be printed to an image file, such as a pdf or tiff format image file, which may be transmitted to the insured by e-mail transmission directly to the insured or to the insured s broker to furnish to the insured. The file may be made available on a server, such as on a secure server accessible via a browser using suitable credentials, such as a user identification and password. The address of the secure server, user identification and password may be furnished to the insured via e-mail, fax transmission or other mode of transmission. The policy may be transmitted via facsimile to the insured or to the insured s broker. The broker may present the facsimile transmitted or e-mailed and printed policy to the insured. The policy comes into effect upon furnishing of the policy to the insured. In cases where the insured and the policy owner are different persons, the policy comes into effect upon furnishing of the policy to the policy owner.

The premium in the issued policy may be based on rate tables that set premiums per dollar or other unit value of insurance for each combination of age, gender and rating classification. The premium may be fixed, or may be determined based on a schedule in the policy. The premium may be subject to change in those policies in which the insurance company has the right to change the rates in the schedule from time to time. The policy may be in the nature of a flexible premium policy which permits the policy owner to select a payment amount within a range to obtain a corresponding value of insurance, as indicated, for example, in a schedule or formula in the policy. Rating classifications represent the result of the medical underwriting process. Exemplary rating classifications used by insurance companies include: super preferred, preferred, standard, substandard, preferred-nicotine and standard-nicotine. In general, the higher the rating category, the lower the premium per unit of insurance for a given gender and age. These rating classifications are merely exemplary. The use of rating categories to summarize the results of comprehensive underwriting is also exemplary. For example, numerical values may be employed.

In an embodiment, the rating classification may be based on a rating classification submitted with the application for insurance. A majority of life insurance policies are issued, after comprehensive underwriting, with the same rating classification predicted by the insurance agent. In policies issued using embodiments of a method and system of the invention with a rating classification predicted by an agent, the policy rating classification is often as predicted by the agent. The premium is thus as predicted by the agent.

In an embodiment, the premium for the policy as written and prior to comprehensive underwriting may have a value different from the value that would be determined based on a rating classification submitted with the application for insurance. For example, the premium may be based on a distinct schedule applicable to policies issued in accordance with an embodiment of the system and method disclosed herein.

In another embodiment, a policy issued in connection with a method and system of the invention may have a rating classification used only for those policies until comprehensive underwriting is complete. For example, the rating classification may be designated as 'insurable. The payment made with the application may be a premium for a year of coverage using the insurable rating classification. In an embodiment, the policy may provide for insurance coverage without charge for an initial period, such as 60 days, 90 days or 120 days, sufficient to allow time for comprehensive underwriting. If the policy owner, after receiving the results of comprehensive underwriting, and within the initial period, elects not to continue the policy, the premium paid may be refunded in full.

In an embodiment, payment is made with the application by paper check. In another embodiment, payment is made with the application by debit card. Payment may be made in other modes, such as electronic funds transfer, credit card, money order, cash, transfer from another account with the insurance company, transfer from another account, such as a 1035 exchange, or other modes.

The policy provides for coverage for all causes of death, subject to customary exclusions, such as the customary exclusion for death by suicide during an initial period. The policy is not limited for example, to accidental causes of death.

At the time of issue of the policy, the system may provide an output signal having instructions for payment of a commission to the broker. The suitable commission amount may be calculated by a separate system based on stored data reflective of terms for calculation of commissions applicable to the broker. In an embodiment, the calculated commission amount may be furnished to a suitable payment processing system for printing and mailing of a check to the broker, or for providing instructions to the insurance company s bank for electronic funds transfer to an account of the broker. In other embodiments, the calculated commission amount may be included in a periodic, such as monthly, reconciliation of all commissions due to the broker, which may be paid by check or electronic funds transfer.

After determining that the prospective applicant is not uninsurable, the system may further provide an output signal with data indicative of commencement of the comprehensive underwriting process. The comprehensive underwriting process may be administered independently of the process for receiving and providing a policy issue decision. In the comprehensive underwriting process, a limited physical examination is typically performed, blood and urine samples are tested, and treating physicians are asked to provide records and information. Information from a variety of commercially available databases regarding the insured s medical history, prescriptions written for the insured, and other information regarding the insured. The particular sources of information consulted during the comprehensive underwriting process may vary. The comprehensive underwriting process will involve at least testing of blood samples and a physical exam to verify at least height and weight of the insured.

When the data resulting from the comprehensive underwriting are received, the insurance company s underwriters evaluate the data and either assigns 355 a rating category to the insured, or determines that the insured is uninsurable. As the insured has responded to questions designed to identify those insureds who are aware of facts that would render them uninsurable, the determination that the insured is in fact uninsurable will very likely be because of information regarding the insured s health determined during the comprehensive underwriting process. For example, the results of blood or urine testing or a physical examination may identify a chronic disease or a potentially terminal illness that was not known to the insured.

The rating category or uninsurable status is received 360 by the system. Upon receipt of the rating category, if the insured has been determined 370 to be uninsurable, the system assigns 375 to the insured the rating category that is appropriate for the highest risk of death, and hence the highest premium cost per unit of insurance. For example, in a rating category system in which substandard is the rating category for insureds having the highest risk of death, then an insured who has been determined to be uninsurable is assigned to the substandard rating category. If the insured is not uninsurable, then the system compares 385 the rating category assigned during underwriting to the rating category associated with the policy. If the rating category assigned during underwriting is the same as the rating category associated with the policy, then an output signal having data indicative that there will be no change in the premium, or other change in the policy, may be provided 392. The output signal may result in a notification that is received by the insured and/or a broker that there will be no change in the premium or other change in the policy 394. By way of example, referring to FIG. 2, an output signal may be provided by mainframe system 222 to printing and mailing system 228 to print and mail via postal mail a letter to the insured and/or the insured s broker stating that the comprehensive underwriting process has been completed and that there will be no change in the policy premium.

Referring again to FIG. 3B, if the system determines that there is a difference between the rating category assigned during underwriting and the rating category associated with the policy, then an output signal is generated having data indicative of the change. The output signal may be provided to the policy generation system of the insurance company for generation of policy documents, such as policy amendments reflecting a premium revised to reflect the change in rating. In an embodiment, no term or condition of the policy is changed resulting from comprehensive underwriting. Policy provisions, including, by way of non-limiting example, term, death benefit amount, cash value and formulas for determination of cash value, exclusions, and riders are not changed.

In an embodiment, the policy, on issue, may have one or more provisions relating to the performance of comprehensive underwriting. These provisions may be modified or removed after the completion of comprehensive underwriting. These provisions may be modified or removed even if there is no change in the premium. By way of example, the policy provisions may impose certain requirements on the insured with respect to cooperation with comprehensive underwriting, and may cause the policy to terminate within a certain time period, in some cases after written notice from the insurance company to the insured, if the necessary steps are not taken. The policy provisions will permit the insurance company to change the premium amount in response to the results of the comprehensive underwriting process. In an embodiment, the policy generating system may issue amendments indicating that these provisions are no longer applicable. In an embodiment, the policy at issue includes a schedule of premiums including premiums for amounts of insurance at an insurable rating associated with the policy until the completion of comprehensive underwriting, and premiums for insurance at various rating classifications that are assigned upon completion of comprehensive underwriting.

If there is a change in premium, the insured and/or the insured s broker receives the amended policy documents indicating a change in premium. The policy will remain in force so long as the insured complies with premium payment obligations. If the insured fails to make further premium payments, the policy will lapse in accordance with its terms. In the event a signal is received from a policy administration system that the policy has lapsed, a system may calculate a charge back of all or a portion of any commission amount previously paid to the broker. Similarly, if the proposed insured fails to cooperate with the comprehensive underwriting process, a system may calculate a charge back of all or a portion of any commission amount previously paid to the broker.

In an embodiment, the policy may issue within two business days after receipt of the application and premium. In an embodiment, the comprehensive underwriting process may require approximately the time required in the prior art, such as about 35 days.

In a method and system of the invention, a policy remains in effect even if the comprehensive underwriting process determines that the insured is uninsurable. An individual who is uninsurable has a mortality risk that is too high for the insurance company to insure at the insurable risk category having the highest mortality risk. The mortality experience for policies issued in accordance with embodiment of a method and system of the invention is thus likely to be higher than the mortality experience for life insurance policies issued only after comprehensive underwriting. The cost to the insurance company of the death benefit will be greater than for policies issued only after comprehensive underwriting. As explained above, the method and system of the invention is advantageous because of a reduction in costs of comprehensive underwriting associated with policies that never issue.

Figure 4:
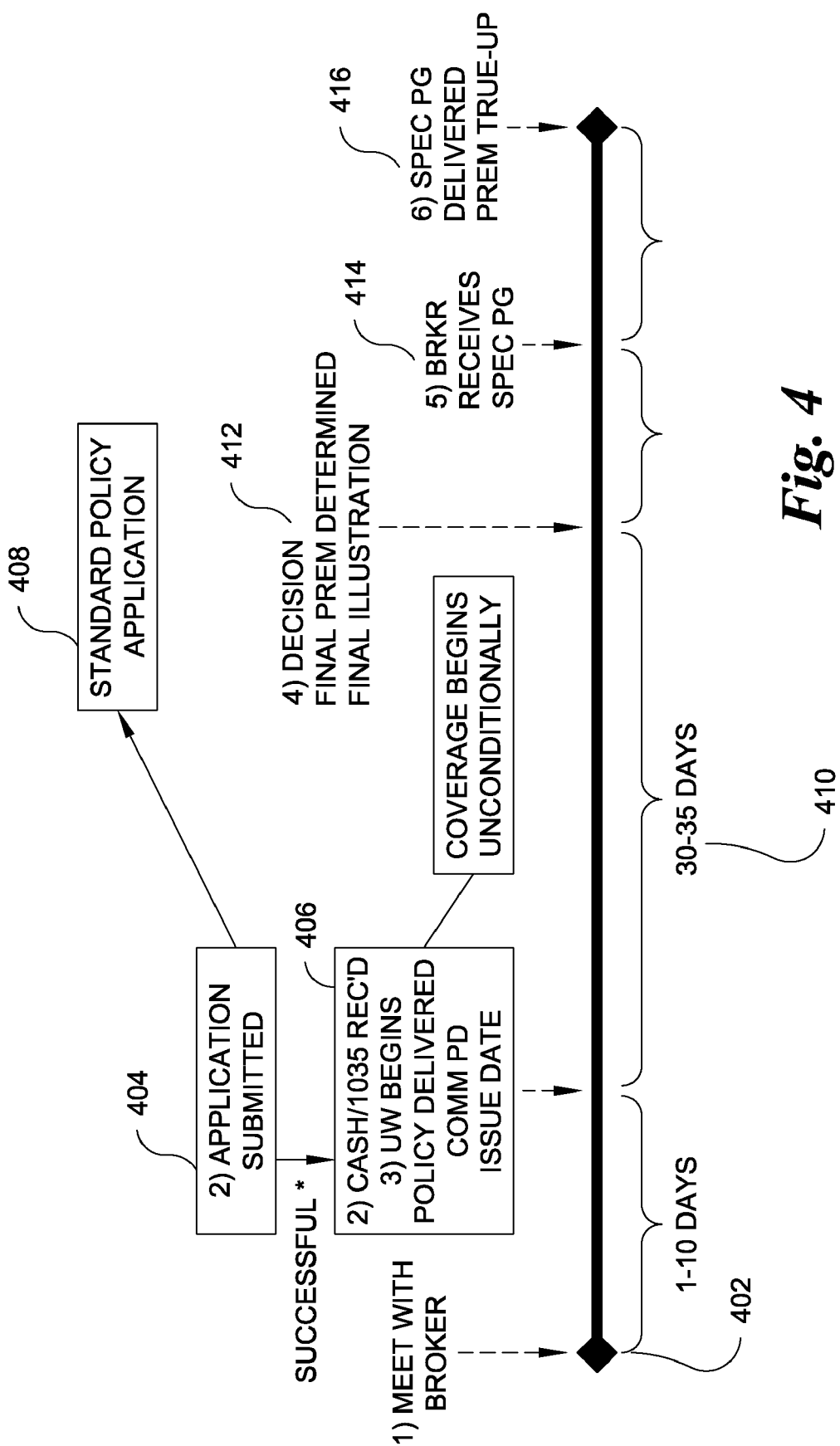
FIG. 4 is a timeline showing timing of steps in an embodiment of the invention.

Referring to FIG. 4, a timeline is shown of an embodiment of a method and system. At 402, the proposed insured meets with an agent or broker, who obtains information, provides illustrations, and assist the proposed insured with submission of the application 404 and the initial premium payment 406. The commission is paid to the broker. If the conditions for issue are not met, the application may proceed 408 according to a different submission process. During the comprehensive underwriting process 410, taking about 30 to 35 days, the insurance company obtains information on the proposed insured, such as through databases, blood and urine sample testing, questionnaires and interviews with treating physicians, in-person examination by medical technicians, and other ways. The process is completed at 412. At that time the rating classification is determined, and a final illustration may be delivered to the proposed insured. Any special pages of the policy are delivered to the broker 414, and then delivered to the insured 416. The difference between the actual first year premium and the premium paid at issue is reconciled by payment to the insurance company or payment to the insured.

Figure 5:
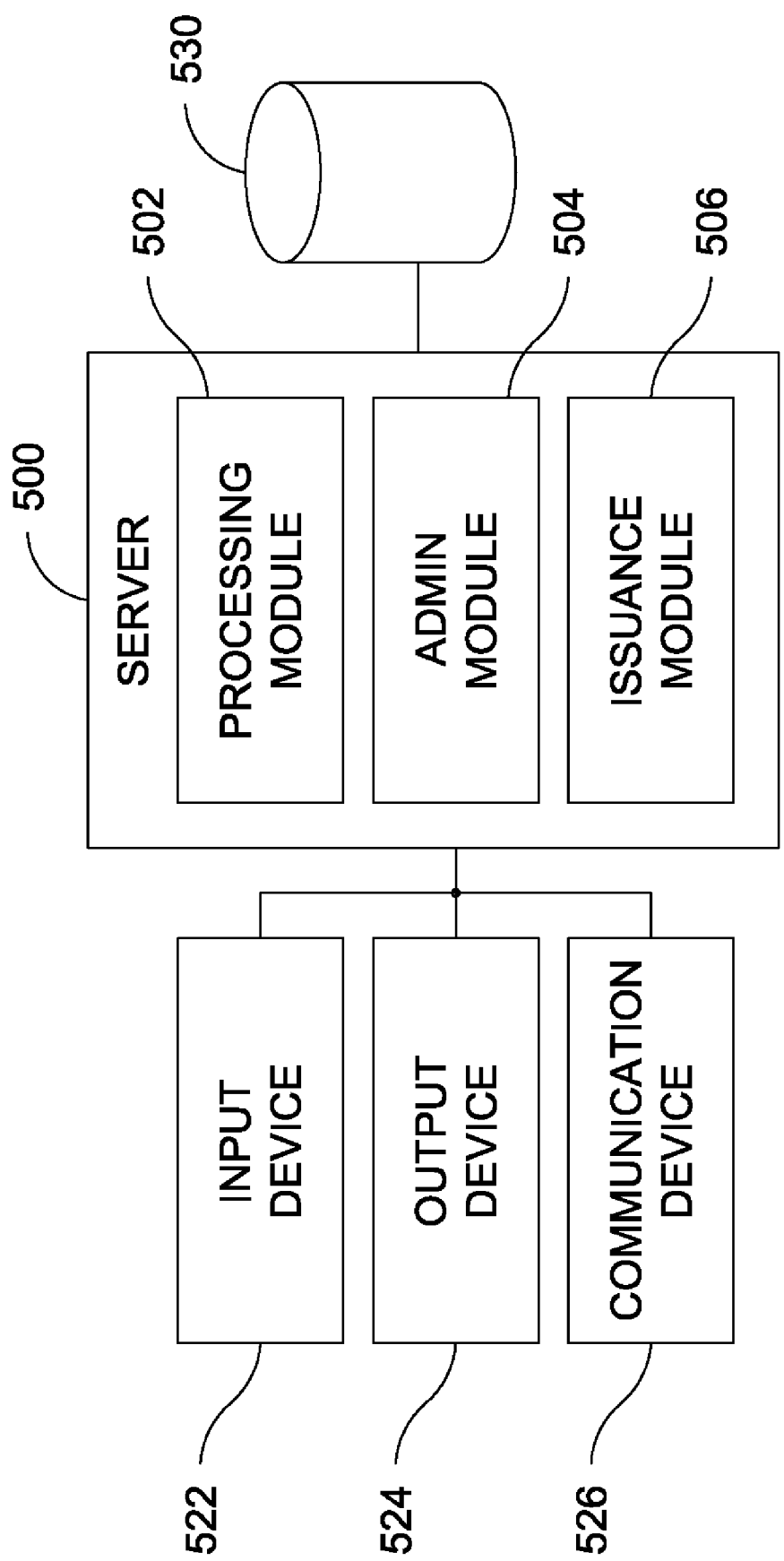
FIG. 5 is a schematic diagram of an alternative server-based computer system for implementation of a method and system of the invention.

Referring to FIG. 5, a computer system for implementation of a method and system of the invention is shown. Server 500 has processing module 502, administration module 504 and issuance module 506.

Processing module 502 is for receiving data indicative of an application and an initial premium payment from a proposed insured for life insurance and for determining, based on the received data, whether the proposed insured is uninsurable. Administration module 504 is for, responsive to a determination by the processing module 502 that the proposed insured is not uninsurable, administering a comprehensive underwriting process, and for determining a rating classification based on a result of the comprehensive underwriting process. Processing module 502 may pass data relating to the application, if the prospective insured is not eligible for a life insurance policy under the method and system of the invention, but still may meet insurability requirements, to other systems of the insurance company for processing of the application according to the insurance company s standard procedures. Administration module 504 may monitor performance of the collection and evaluation of data in the comprehensive underwriting process. Administration module 504 may further assign an insurable rating classification to the insured on issue of the policy; the initial premium payment is for one year of coverage at the insurable rating classification. Administration module 504 is further for, upon receipt of data indicative of cancellation of the policy by the insured within an initial period, causing a refund of the premium to be paid to the insured. Issuance module 506 is for issuing an insurance policy to the proposed insured responsive to the determination by the processing module that the proposed insured is not uninsurable. Administration module 504 may calculate commissions payable to a broker at the time of issue of the policy, and issue instructions to a payment system to effect a payment, or provide data indicative of instructions to update a broker s account with a credit to a system that administers payments to brokers. Administration module 504 may calculate any changes in commission amount after completion of comprehensive underwriting, and provide an output signal to the system for administering payments to brokers of any credits or debits to the broker s account. Issuance module 506 may furnish the life insurance policy to the proposed insured. The policy may be furnished by printing and mailing a physical copy of the policy, transmitting an electronic file having an image of the policy to the proposed insured, or by making an electronic file having an image of the policy accessible to the proposed insured on a server.

Server 500 is in communication with datastore 530, which may be a local or networked data storage device or a database accessed via a database server. Datastore 530 stores data pertinent to the life insurance policy, including policy terms, owner data, insured data, beneficiary data, broker data, and data related to underwriting and classification.

Server 500 communicates with other devices via communication device 526, and includes user interfaces including input device 522, such as keyboard or mouse, and output device 524, such as a display or printer.

Figure 6:
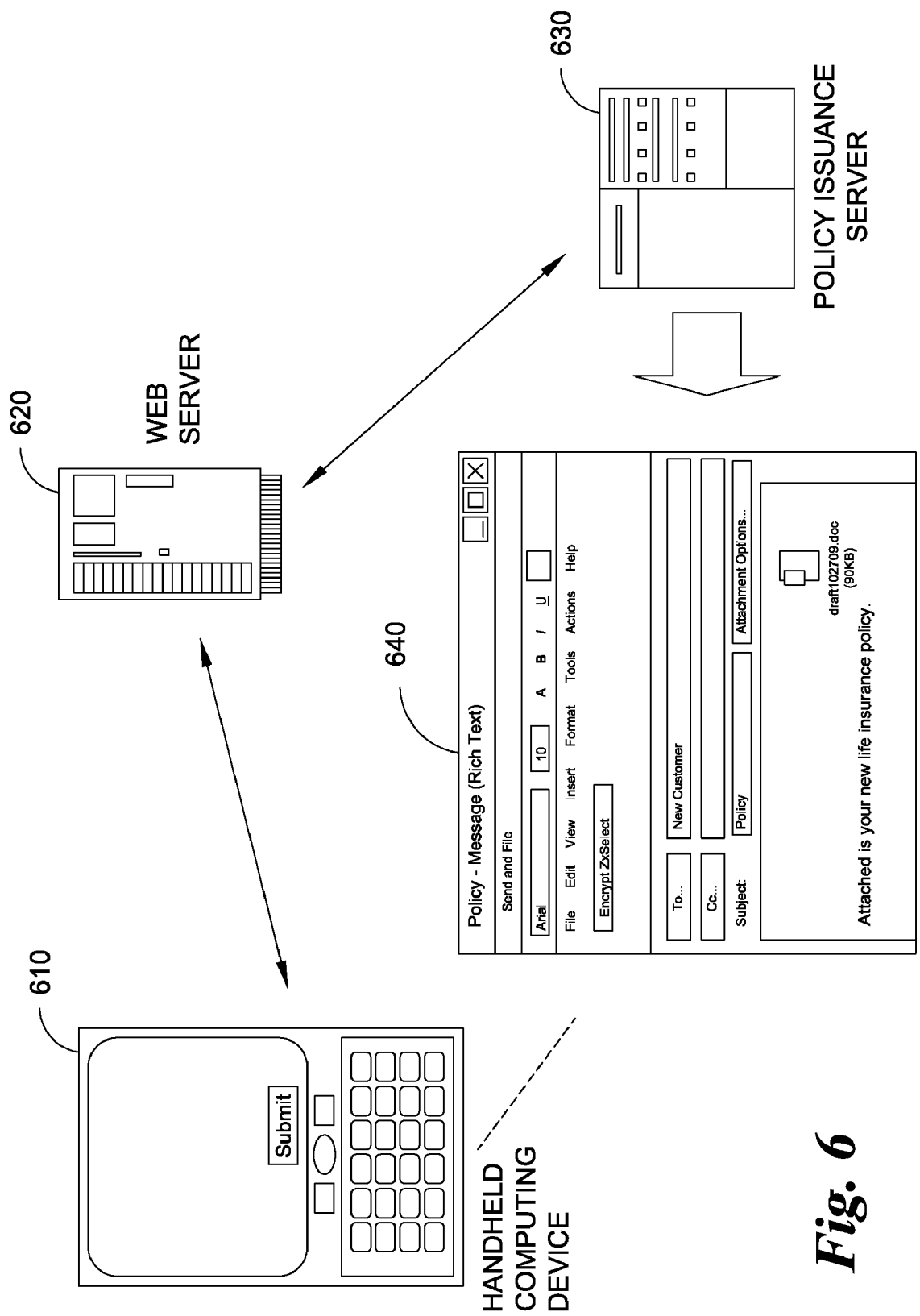
FIG. 6 is a schematic diagram of an implementation of a method and system of the invention for application submission and delivery of policy via a smart phone.

Referring to FIG. 6, an implementation is shown in which the application is submitted via handheld communications device, such as a smart phone 610. The application may be completed via a local application, or via a browser based fillable form. The pressing of the submit button on smart phone 610 causes the required application data to be submitted to web server 620. The smart phone may also authorize a proposed insured s bank to transmit funds in the amount of the initial premium payment to the insurance company. The web server provides the data to policy issuance server 630, which processes the data, and, if appropriate, causes a policy to be generated. A web page 640 may then be generated and displayed on smart phone 610, including a link that permits the user to access the life insurance policy. The life insurance policy may thus be issued the same day as submission of the application and premium payment from the user s smart phone. In an embodiment, the handheld communications device is configured to authenticate an identity of the proposed insured, such as via one or more biometric, password and/or security based procedures. In an embodiment, web server 620 and/or policy issuance server 630 may be operated or controlled by an insurance company and/or an agent affiliated or owned by an insurance company. Communications between handheld communications device 610 and web server 620 and/or policy issuance server 630 may be accomplished via one or more secure cryptographic based communications schemes. In an embodiment, a real time help facility may be implemented to facilitate completion of the insurance application and to assist with the policy issuance process via the handheld communications device.

The present invention is operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

A system in accordance with the invention may include means corresponding to each step in each method described herein. Each means may be implemented by a processor executing instructions contained in programs which may be stored in a storage medium and loaded into random access memory for execution. It will be appreciated that any of the steps in the methods in accordance with the invention described herein may be so implemented.

An exemplary advantage of a system and method in accordance with an embodiment is that a prospective insured may obtain policy coverage without the need to wait until the completion of a full medical underwriting process. A further exemplary advantage is that full medical underwriting is completed and the price of coverage is set based on the results of full medical underwriting. A further exemplary advantage is that reasons that in the prior art motivate prospective insureds to choose not to proceed after the completion of medical underwriting, such as the lack of policy issue, are decreased.

An exemplary advantage as compared with the Harkensee 583 disclosure is that the comprehensive medical underwriting is carried out for all applications after the policy is issued. A further advantage is that the insurance company cannot permit the insurance contract to expire or reduce the benefits.

An exemplary advantage as compared with the Harkensee 584 disclosure is that comprehensive medical underwriting is carried out for all applications after the policy is issued. A further advantage is that the premium may set consistent with traditionally underwritten policies at the outset.

An exemplary advantage as compared with the Harkensee 585 disclosure is that the policy in an embodiment of a method and system of the present invention provides for coverage for both natural causes and accidental death from the outset of the policy.

While the foregoing invention has been described with reference to the above embodiments, various modifications and changes can be made without departing from the spirit of the invention. Accordingly, all such modifications and changes are considered to be within the scope of the appended claims.

What is claimed is:

1. A computer system for administering applications for life insurance, comprising:
    a processor;
    a memory storage device in communication with the processor;
    the processor configured to:
    receive data indicative of an application by a proposed insured for life insurance, the data including a rating category, and an initial premium payment;
    based exclusively on the received data indicative of an application by a proposed insured for life insurance, determine whether the proposed insured is uninsurable;
    responsive to a determination that the proposed insured is uninsurable, generate an output signal having data indicative of a decision to respond to the application by declining to provide insurance;
    responsive to a determination that the proposed insured is not uninsurable, generate an output signal having data indicative of a decision to respond to the application by issuing a policy, having the received rating category assigned to the proposed insured, and commencing a comprehensive underwriting process;
    receive data indicative of a result of the comprehensive underwriting process;
    based on the result of the comprehensive underwriting process, determine a rating category of the proposed insured; and
    if the determined rating category is the same as the received rating category, provide an output signal indicative of no change to the policy, and otherwise provide an output signal indicative of a changed premium for the policy and no other change to the policy.

2. The system of claim 1, wherein the processor is further configured to determine a rating category of the proposed insured, responsive to the proposed insured being identified as uninsurable as a result of the comprehensive underwriting, by assigning a rating category having a highest mortality risk to the proposed insured.

3. The system of claim 1, wherein the processor is further configured to, responsive to a determination that the proposed insured is not uninsurable, provide an output signal having data indicative of a commission to be paid to a broker in connection with issue of the policy.

4. The system of claim 1, wherein the determination whether the proposed insured is uninsurable is made not later than two business days after receipt of the data indicative of the application.

5. The system of claim 1, wherein the received data indicative of an application by a proposed insured for life insurance includes a death benefit amount, and wherein the policy includes the death benefit amount.

6. The system of claim 1, wherein the policy is a whole life insurance policy.

7. The system of claim 1, wherein the received data indicative of an application by a proposed insured for life insurance further comprises data indicative of responses to a set of questions inquiring whether the proposed insured has received a diagnosis of or treatment for a plurality of diseases and conditions.

8. The system of claim 7, wherein the data indicative of responses to a set of questions comprises data indicative of whether the proposed insured has received a diagnosis of or treatment for any of diabetes or one or more cancers.

9. The system of claim 7, wherein the processor is configured to access data indicative of rules for evaluating the data indicative of responses, the data indicative of rules causing the processor to determine, responsive to accessing data indicative of one or more affirmative responses to the questions inquiring whether the proposed insured has received a diagnosis of or treatment for a plurality of diseases and conditions, data indicative that the proposed insured is uninsurable.

10. The system of claim 9, wherein the processor is configured to, responsive to determining data indicative that the proposed insured is uninsurable, provide output data indicative of instructions to notify the proposed insured that coverage has been declined.

11. The system of claim 1, further comprising a policy generation system in communication with the processor and configured to, responsive to receipt of the output signal having data indicative of a decision to respond to the application by issuing a policy, generate a life insurance policy on the life of the proposed insured to be furnished to the proposed insured.

12. A computer-implemented method for processing life insurance applications, comprising:
receiving by a processor data indicative of an application by a proposed insured for life insurance, the data including a rating category, and an initial premium payment, and storing the received data indicative of an application by a proposed insured for life insurance in a data storage device in communication with the processor;
based exclusively on the received data indicative of an application by a proposed insured for life insurance, determining by the processor whether the proposed insured is uninsurable;
responsive to a determination that the proposed insured is uninsurable, generating by the processor an output signal having data indicative of a decision to respond to the application by declining to provide insurance and providing the output signal to a network;
responsive to a determination that the proposed insured is not uninsurable, generating by the processor an output signal having data indicative of a decision to respond to the application by issuing a policy, having the received rating category assigned to the proposed insured, and commencing a comprehensive underwriting process;
receiving by the processor data indicative of a result of the comprehensive underwriting process;
based on the result of the comprehensive underwriting process, determining by the processor a rating category of the proposed insured; and
if the determined rating category is the same as the received rating category, providing by the processor an output signal for transmission via a network to a user-accessible device having data indicative of no change to the policy, and otherwise providing by the processor an output signal for transmission via a network to a user-accessible device having data indicative of a changed premium for the policy and no other change to the policy.

13. The computer-implemented method of claim 12, further comprising, determining by the processor a rating category of the proposed insured, responsive to the proposed insured being identified as uninsurable as a result of the comprehensive underwriting, by assigning a rating category having a highest mortality risk to the proposed insured.

14. The computer-implemented method of claim 12, further comprising, responsive to a determination that the proposed insured is not uninsurable, providing by the processor an output signal having data indicative of a commission to be paid to a broker in connection with issue of the policy.

15. The computer-implemented method of claim 12, wherein the determination whether the proposed insured is uninsurable is made not later than two business days after receipt of the data indicative of the application.

16. The computer-implemented method of claim 12, wherein the received data indicative of an application by a proposed insured for life insurance includes a death benefit amount, and wherein the policy includes the death benefit amount.

17. The computer-implemented method of claim 12, wherein the policy is a whole life insurance policy.

18. The computer-implemented method of claim 12, wherein the received data indicative of an application by a proposed insured for life insurance further comprises data indicative of responses to a set of questions inquiring whether the proposed insured has received a diagnosis of or treatment for a plurality of diseases and conditions.

19. The computer-implemented method of claim 18, wherein the data indicative of responses to a set of questions comprises data indicative of whether the proposed insured has received a diagnosis of or treatment for any of diabetes or one or more cancers.

20. The computer-implemented method of claim 18, further comprising accessing by the processor data indicative of rules for evaluating the data indicative of responses, and, in accordance with the data indicative of rules, determining, responsive to accessing data indicative of one or more affirmative responses to the questions inquiring whether the proposed insured has received a diagnosis of or treatment for a plurality of diseases and conditions, data indicative that the proposed insured is uninsurable.

21. The computer-implemented method of claim 20, further comprising, responsive to determining data indicative that the proposed insured is uninsurable, providing output data indicative of instructions to notify the proposed insured that coverage has been declined.

22. The computer-implemented method of claim 12, further comprising receiving by a policy generation system in communication with the processor the output signal having data indicative of a decision to respond to the application by issuing a policy, and responsive to receipt of the output signal having data indicative of a decision to respond to the application by issuing a policy, generating by the policy generation system a life insurance policy on the life of the proposed insured to be furnished to the proposed insured.

23. A non-transitory computer-readable storage medium having processor-executable instructions thereon, which instructions, when executed by a processor, cause the processor to:

receive data indicative of an application by a proposed insured for life insurance, the data including a rating category, and an initial premium payment, and store the received data indicative of an application by a proposed insured for life insurance in a data storage device in communication with the processor;

based exclusively on the received data indicative of an application by a proposed insured for life insurance, determine whether the proposed insured is uninsurable;

responsive to a determination that the proposed insured is uninsurable, generate an output signal having data indicative of a decision to respond to the application by declining to provide insurance and providing the output signal to a network;

responsive to a determination that the proposed insured is not uninsurable, generate an output signal having data indicative of a decision to respond to the application by issuing a policy, having the received rating category assigned to the proposed insured, and commencing a comprehensive underwriting process;

receive data indicative of a result of the comprehensive underwriting process;

based on the result of the comprehensive underwriting process, determine a rating category of the proposed insured; and if the determined rating category is the same as the received rating category, provide an output signal for transmission via a network to a user-accessible device having data indicative of no change to the policy, and otherwise provide an output signal for transmission via a network to a user-accessible device having data indicative of a changed premium for the policy and no other change to the policy.

24. The non-transitory computer-readable storage medium of claim 23, wherein the instructions, when executed by the processor, further cause the processor to determine a rating category of the proposed insured, responsive to the proposed insured being identified as uninsurable as a result of the comprehensive underwriting, by assigning a rating category having a highest mortality risk to the proposed insured.

25. The non-transitory computer-readable storage medium of claim 23, wherein the instructions, when executed by the processor, further cause the processor to, responsive to a determination that the proposed insured is not uninsurable, provide an output signal having data indicative of a commission to be paid to a broker in connection with issue of the policy.

26. The non-transitory computer-readable storage medium of claim 23, wherein the determination whether the proposed insured is uninsurable is made not later than two business days after receipt of the data indicative of the application.

27. The non-transitory computer-readable storage medium of claim 23, wherein the received data indicative of an application by a proposed insured for life insurance includes a death benefit amount, and wherein the policy includes the death benefit amount.

28. The non-transitory computer-readable storage medium of claim 23, wherein the policy is a whole life insurance policy.

29. The non-transitory computer-readable storage medium of claim 23, wherein the received data indicative of an application by a proposed insured for life insurance further comprises data indicative of responses to a set of questions inquiring whether the proposed insured has received a diagnosis of or treatment for a plurality of diseases and conditions.

30. The non-transitory computer-readable storage medium of claim 23, wherein the data indicative of responses to a set of questions comprises data indicative of whether the proposed insured has received a diagnosis of or treatment for any of diabetes or one or more cancers.

31. The non-transitory computer-readable storage medium of claim 29, wherein the instructions, when executed by the processor, further cause the processor to access data indicative of rules for evaluating the data indicative of responses, the data indicative of rules causing the processor to determine, responsive to accessing data indicative of one or more affirmative responses to the questions inquiring whether the proposed insured has received a diagnosis of or treatment for a plurality of diseases and conditions, data indicative that the proposed insured is uninsurable.

32. The non-transitory computer-readable storage medium of claim 31, wherein the instructions, when executed by the processor, cause the processor to, responsive to determining data indicative that the proposed insured is uninsurable, provide output data indicative of instructions to notify the proposed insured that coverage has been declined.

33. The non-transitory computer-readable storage medium of claim 23, wherein the instructions, when executed by the processor, further cause the processor to direct the output signal having data indicative of a decision to respond to the application by issuing a policy to a policy generation system in communication with the processor, the policy generation system being configured to, responsive to receipt of the output signal having data indicative of a decision to respond to the application by issuing a policy, generate a life insurance policy on the life of the proposed insured to be furnished to the proposed insured.

* * * * *